Sept. 4, 1945. J. E. POORMAN 2,384,044
REVERSING MECHANISM
Original Filed Aug. 10, 1942 3 Sheets-Sheet 1
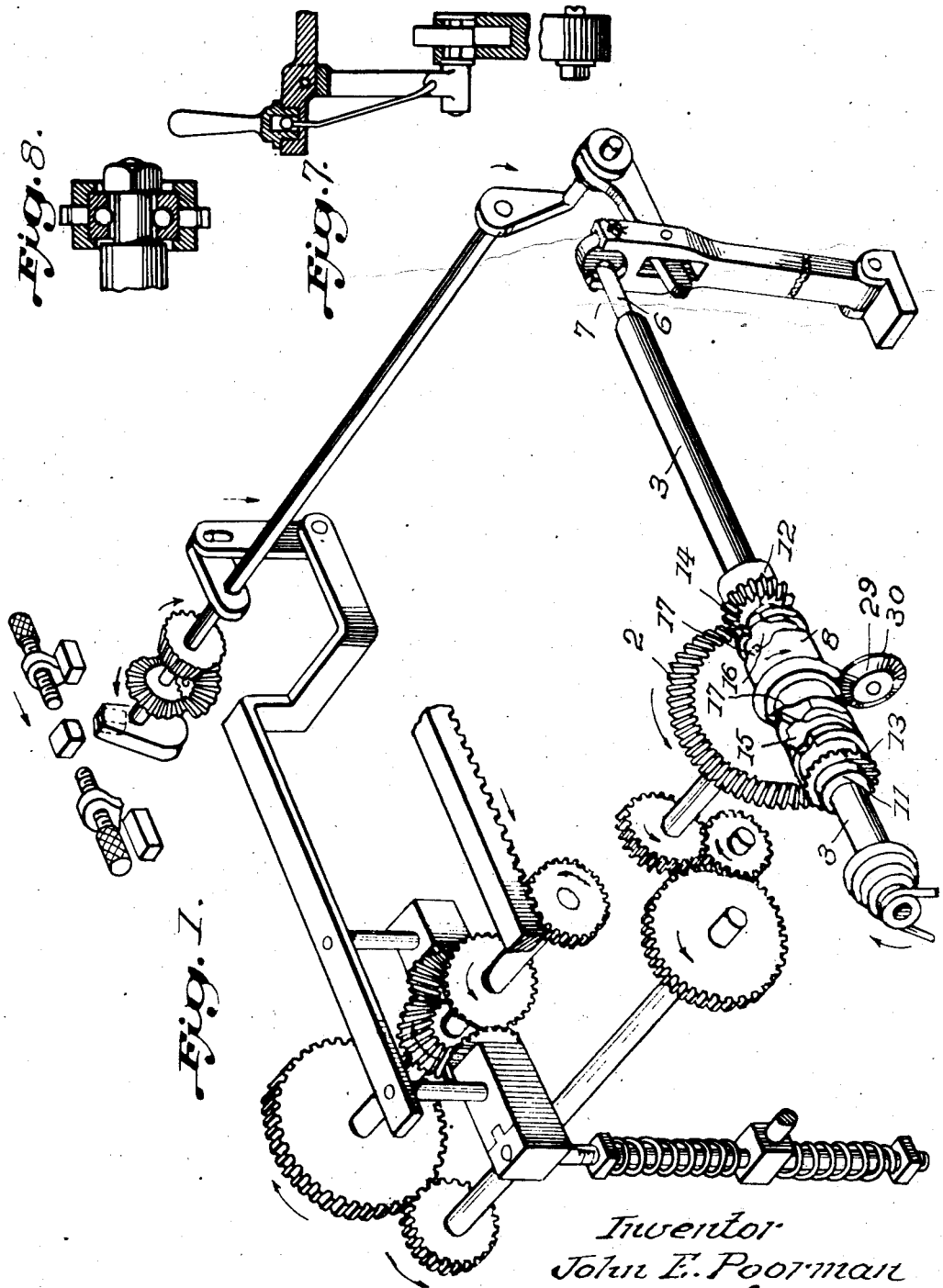
Inventor
John E. Poorman
Atty.

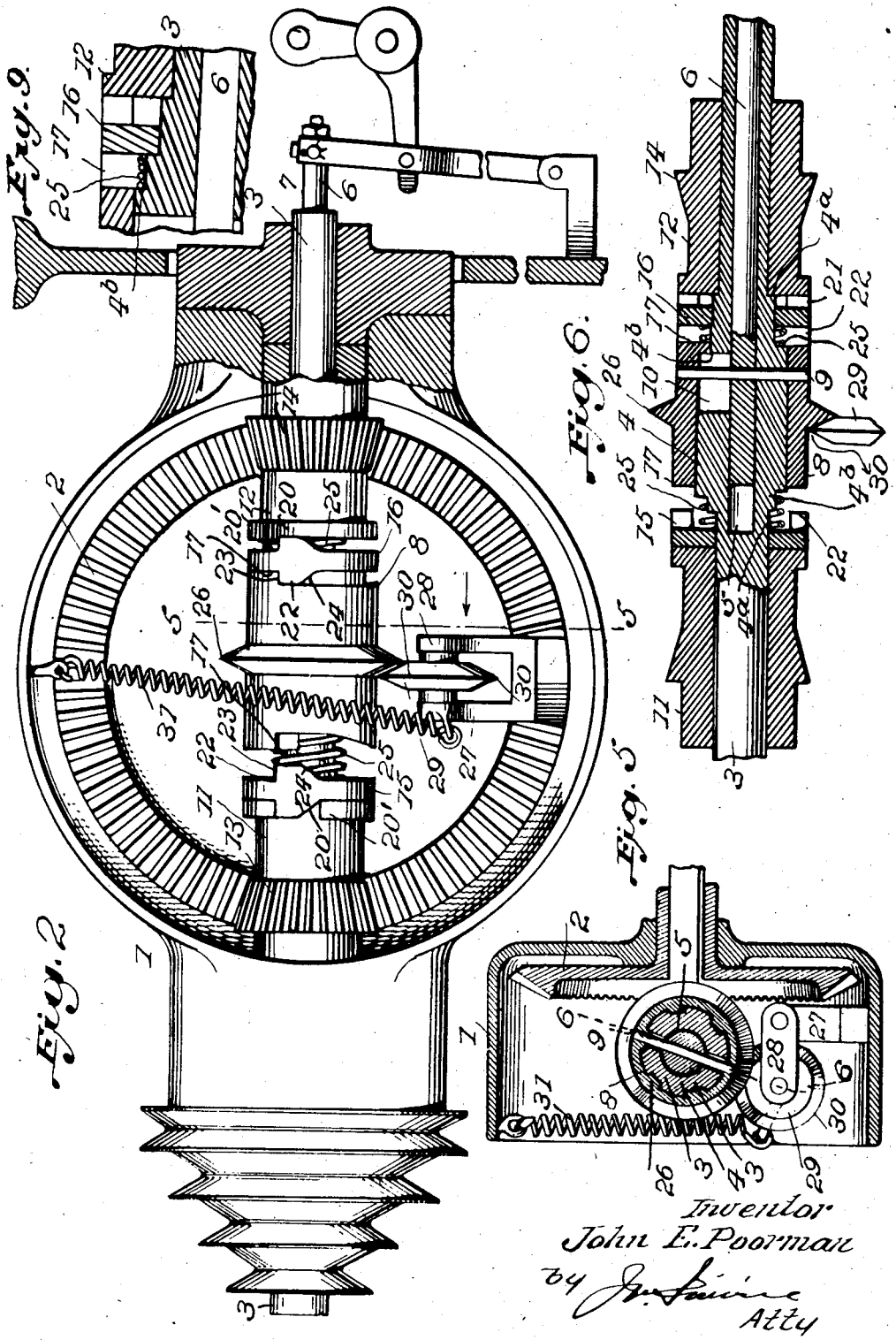

Sept. 4, 1945.                J. E. POORMAN                2,384,044
                            REVERSING MECHANISM
              Original Filed Aug. 10, 1942     3 Sheets-Sheet 3
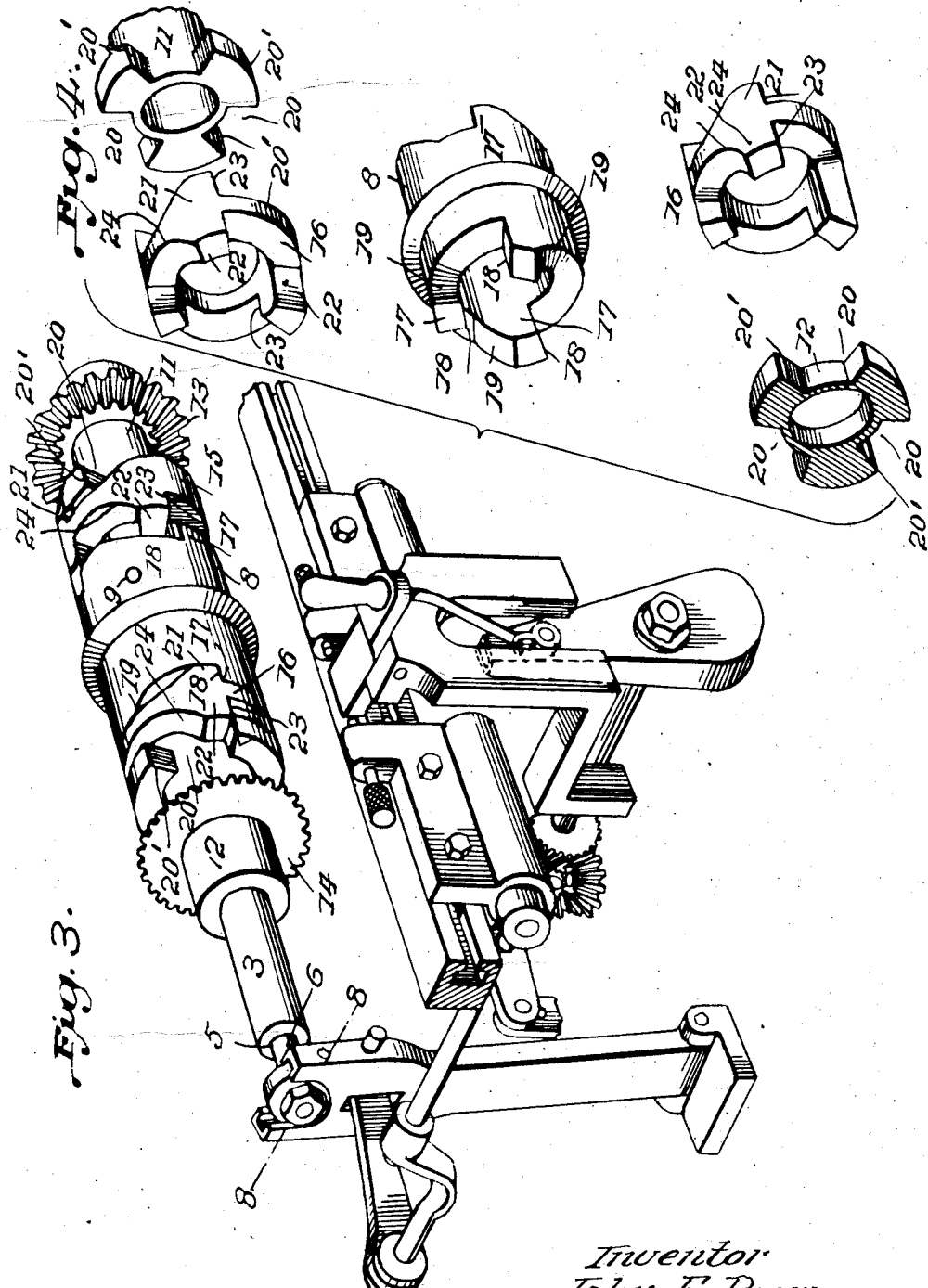
Inventor
John E. Poorman
by J. M. Swine
                 Atty.

Patented Sept. 4, 1945

2,384,044

UNITED STATES PATENT OFFICE 2,384,044

REVERSING MECHANISM

John E. Poorman, Philadelphia, Pa.

Original application August 10, 1942, Serial No. 454,309. Divided and this application February 22, 1943, Serial No. 476,712

20 Claims. (Cl. 192—51)

This invention is directed to an improvement in reversing mechanism, designed to be automatically operated by the machine with which it is associated, to reverse the power train of that machine at predetermined and selected periods.

The primary object of the present invention is the provision of a reversing clutch, the power train driving elements of which are in continuous mesh with the prime gear of the power train, with the clutch including an automatically controlled element by which the power train driving elements may be selectively operated by the power and thus drive the prime gear of the power train in the selected direction.

As the power train driving elements of the clutch, in the form of pinions, are in constant mesh with the prime gear of the power train, such pinions are constantly driven, with one or the other serving to drive the power train. Under these circumstances, when the mechanism of the clutch is operated to reverse the power train, there will of necessity be more or less of a shock when the cooperating parts incident to the shift are brought into cooperative driving relation. This shock is ordinarily a distinct disadvantage, in that it creates undue wear and puts an added strain on the driving function particularly in its initiation.

It is therefore one of the primary objects of the present invention to provide a reversing clutch of the type described, in which the driving cooperation between the selected elements in the shifting of the clutch are brought into contact initially in a manner to cushion their initial driving cooperation to inaugurate an initial frictional movement of the engaged element at a speed less than its driving speed so that when the parts finally cooperate in driving relation, both parts are initially moving in the driving direction to avoid direct shock of the cooperation of a driving part and a part at rest.

The invention is illustrated in the accompanying drawings, in which:

Figure 1 is a diametric perspective view showing the reversing clutch means in cooperation with the main gear of the power train.

Figure 2 is a face view of the reversing clutch.

Figure 3 is a perspective view of the same.

Figure 4 is a perspective view of the reversing clutch details shown in separated relation.

Figure 5 is a section on line 5—5 of Figure 2.

Figure 6 is a section on line 6—6 of Figure 2.

Figure 7 is a detail section of a shifting mechanism to reverse the power means at will.

Figure 8 is a detail cross section on line 8—8 of Figure 3.

Figure 9 is a detail section illustrating the shoulder $f$ against which the springs bear to hold the clutching collars in position.

The reversing mechanism of the present invention includes an annular open end housing 1, arranged adjacent the primary gear 2 of the power train. A shaft 3 extends substantially diametrically of the housing and mounted in appropriate bearings therein. The shaft is circumferentially enlarged for a portion of its length, as at 4, and axially bored at 5 throughout the enlarged portion. A secondary shaft 6 is slidably fitted in the bore 5, and extends at one end through the bore 5 of the shaft 3 and beyond the proximate end of that shaft, as at 7.

A sleeve 8 is slidably mounted on the enlarged portion 4 of the shaft 3 and held against relative rotation with respect to shaft 3 by a pin 9, which extends through the sleeve and through the end of the secondary shaft 6, said pin passing through a slot 10 in the shaft 3 to permit relative longitudinal movement of the sleeve 8 by movement of the secondary shaft 6, to the limits permitted by the slot 10.

Mounted on shaft 3, on opposite sides of the sleeve 8, are pinion collars 11 and 12, each collar being held against independent longitudinal movement of the shaft but freely rotatable thereon. Integral with the pinion collars are pinions 13 and 14 respectively, which are in constant mesh with the primary gear 2 of the power train, at diametrically opposite points on said primary gear and obviously causing the primary gear and thereby the power train to be driven in reverse directions in accordance with the pinion subjected to the driving power.

Mounted on the shaft 3, on opposite sides of the sleeve 8, and between the sleeve and each pinion collar, is a clutch ring indicated respectively at 15 and 16, such clutch rings being mounted for free rotative and limited longitudinal movement on shaft 3 between the sleeve 8 and the adjacent pinion collar. These clutch rings constitute what will be hereinafter termed the shock cushioning members of the reversing clutch, operating to this end in a manner which will be later described.

To provide the clutch relation, the opposite ends of the sleeve 8 are formed with clutch projections or teeth 17, each of which present an abrupt driving face 18 in the direction of drive, and a sloping face 19 in the opposite direction. The pinion collars 11 and 12 are of identical form, and on their ends toward the sleeve 8, are formed with clutch recessses 20 between teeth projections 20'. The clutch rings 15 and 16 are formed on each of their opposite edges with clutch teeth 21 and 22, each of which is formed with an abrupt face 23 and an inclined face 24. The clutch rings thus have teeth on both sides, the teeth of one side cooperating with the sleeve 8, and the teeth on the other side cooperating with the adjacent pinion collar 11 or 12. A spring 25 encircles the shaft 3 and bears between the sleeve 8 and the adjacent clutch ring tending to normally force the ring in clutching cooperation with the adjacent pinion collar, serving thus to keep the clutch ring, which is not in driving cooperation with the clutch, out of possible engagement with the adjacent teeth of the sleeve 8. The enlarged portion 4 of shaft 3 is diametrically reduced at 4ª beyond the seat for the sleeve 8 to house one end of the cooperating spring 25 to permit the sleeve 8 in movement to pass over the spring. The shaft 3, beyond the reduced portion 4ª relative to sleeve 8, is further reduced to provide an abrupt shoulder 4ᵇ. The clutch rings 15 and 16 are free on shaft 3 beyond the shoulders 4ª, but are limited in their movement toward the sleeve 8, or more particularly in a direction from the adjacent pinion collar by the shoulders 4ᵇ.

It will of course be apparent that with the sleeve 8, which is continuously driven in one direction, when in one operative position, for example, as shown at the right hand end of the reversing unit, causes the teeth 17 at the right hand end of the sleeve 8 to engage with the teeth of the adjacent clutch ring, as 15, and the latter is in driving cooperation with the adjacent pinion collar, as 11, to drive the pinion 13 and thus the primary gear 2. During this operation of the primary gear 2, the clutch ring 16 at the opposite end of the reversing assembly is held in operative relation to the adjacent pinion collar by the spring 25, but this clutch collar and pinion collar are idle and moving in a direction opposite the engaged clutch ring and pinion collar at the right hand end of Figure 2, incident of course to the operation of primary gear 2.

When the sleeve 8 is moved to the left in Figure 2 to reverse the direction of movement of primary gear 2, the teeth 17 at the left end of sleeve approach a clutch ring and collar pinion which is then moving in a direction directly opposite the direction of movement of the sleeve. If the teeth on the respective parts to be engaged were simply forced into mesh, the sleeve would have to instantly reverse the engaged clutch ring and pinion collar, which up to this moment has been traveling in a direction opposite the direction of the sleeve. Such an engagement would necessarily result in a relatively severe strain on the parts, produce a wholly undesirable wear, and cause pronounced and objectionable sound. The clutch ring in its operative association when coupled for driving entirely avoids the strain, wear and noise and constitutes an efficient cushion or shock absorber in the following manner.

In the idle association of a clutch ring and pinion collar, as at the left of Figure 2, the spring 25 holds the clutch ring with its teeth in the respective clutch recesses 20 of the pinion collar, the walls or teeth 20' being spaced apart at least sufficient to receive a tooth 21 of the clutch ring and the inclined face 24 of such tooth, as best shown at the right hand end of Figure 1.

As the teeth of the sleeve 8 approach the previously unclutched and oppositely rotating clutch ring, such sleeve teeth will in practically every instance engage the surface of the clutch ring, that is, the inclined face of a tooth. This will create a frictional grip between the teeth of the sleeve and the face of the clutch ring which will gradually stop and reverse the movement of the clutch ring. As the sleeve is of course in constant movement and therefore moving faster than the clutch ring, the teeth of the clutch collar will move over the surface of the ring until the teeth of the sleeve and those of the clutch ring are in registry to be engaged for driving. During this frictional reversal of the clutch ring, the teeth on the face thereof held in the recesses 20 of the pinion collar start to move in a direction opposite the projections 20' forming the recesses 20. In this movement of the clutch ring, the inclined face 24 on such teeth approaches and engages a projection 20' at the end of a recess 20 in the pinion collar. This inclination forces the clutch ring toward the sleeve to the limit permitted by the shoulder 4ᵇ on shaft. As the inclined tooth face 24 bears on the edge of projection 20', the clutch ring, now moving in the proper direction by the frictional engagement of the sleeve 8, exerts a frictional pressure on the pinion collar and starts the collar in the proper direction. The parts are so proportioned that as the clutch ring is forced, by the incline 24 bearing against projection 20' of the pinion collar, against the stop 4ᵇ, the teeth of the clutch ring will not have cleared the recess and the inclined face 24 of the clutch ring teeth will still be in wedging contact with the projection 20' of the pinion collar. As the movements of the sleeve 8 and clutch ring reach a position to permit their teeth to engage for driving, the wedging cooperation between the inclined face 24 of the teeth of the clutch ring will be immovably held at a rigid relation and the pinion collar will be driven thereby in the proper direction to reverse the primary gear 2.

Of course, while the movement has been described at separate operations, the entire operation occurs simultaneously and practically without the slightest evidence of any delay in function. In other words, any movement of the sleeve to reverse direction of the primary gear 2 is instantly productive of complete coupling of parts for such reversal and this without jar, shock, or appreciable noise, and necessarily in the absence of shock and jar without undue wear.

The extended end 7 of the secondary shaft 4 is connected with selected or conventional mechanism to be actuated by the stop elements of the machine being controlled, so that when said machine reaches a predetermined or selected point in its movement under operation of the power train in one direction, the shaft 6 will be longitudinally shifted in the shaft 3, the sleeve moved in a direction opposite to that previously occupied, and the remaining pinion, previously idle, will be brought into driving cooperation with the primary gear 2 of the power train, reversing its operation, and thus reversing the machine.

In order to insure that the sleeve 8 will be given a limited movement in each operation, and to insure a definite and positive positioning of the sleeve when in driving relation, such sleeve is provided with an annular inverted rib 26. Mounted on the frame of the machine is a support 27 carrying a pivoted bar 28, on which bar is mounted a free disc 29, peripherally shaped at 30 to complement rib 26. A spring 31, secured to the frame and to the bar 28, holds a particular face of the periphery of the disc in contact with the appropriate face of the rib to insure that when the sleeve is moved to a point where all teeth on one of the contact relations are out of engagement, the bar 28 yields to permit the peripheral edge of the disc to ride over the rib 26. Under the strain of the spring 31, the peripheral edge of the disc snaps down on the opposite side of the rib to insure the complete and desired movement of the sleeve.

This application is a division of my copending application filed August 10, 1942, Serial No. 454,309.

What I claim is:

1. A reversing assembly for use in connection with power driven machines, of the type including a primary shaft continuously driven by power means, and power reversing elements on the shaft whereby the power may be reversed beyond the assembly, said reversing assembly including relatively opposed power driving elements and an intermediate slide element for selectively driving either of said power elements, and a combined driving and cushioning element freely movable on the primary shaft and interposed between the slide element and the power elements to initially cushion the driving cooperation between such parts.

2. A construction as defined in claim 1, wherein the cushioning element is formed for active driving cooperation with the power element and with the slide element.

3. A construction as defined in claim 1, wherein the cushioning element is formed for wedging cooperation with the power element.

4. A construction as defined in claim 1, wherein the cushioning element is formed for wedging cooperation with the power element, and wherein such wedging cooperation initially serves to compel driving cooperation between the cushioning element and the slide element.

5. A construction as defined in claim 1, wherein the cushioning element is formed for wedging cooperation with the power element, and wherein such wedging cooperation initially serves to compel bodily movement of the cushioning element toward the slide element to insure driving cooperation between the cushioning element and the slide element.

6. A construction as defined in claim 1, wherein the cushioning element is formed for wedging cooperation with the power element to initially reverse such power element and then complete an interlocking cooperation with the power element for driving the same in such reversed direction.

7. A construction as defined in claim 1, wherein the cushioning element is formed for wedging cooperation with the power element, and means on the power shaft to limit movement of the cushioning element in a direction toward the slide element to compel such wedging cooperation between the cushioning element and the power element to drive the latter in the desired direction.

8. A construction as defined in claim 1, wherein the cushioning element is a ring mounted for free rotation relative to and free sliding movement in connection with the power element and the slide element, with such ring formed on opposing faces with teeth to be engaged respectively by the slide element and by the power element.

9. A construction as defined in claim 1, wherein the cushioning element is a ring mounted for free rotation relative to and free sliding movement in connection with the power element and the slide element, with such ring formed on opposing faces with teeth to be engaged respectively by the slide element and by the power element, one face of each of the teeth being inclined to permit a frictional engagement by the teeth of the slide element or power element cooperating therewith to compel an initial frictional movement of the ring prior to the driving cooperation of the teeth.

10. A reversing assembly including a primary shaft continuously driven by a power means, power reversing elements on the shaft including a sleeve having a non-rotary sliding connection with the primary shaft, and a secondary shaft movable axially in the primary shaft and having a fixed connection with said sleeve, and means selectively responsive to the power means for operating the secondary shaft to govern the reversing elements to vary the driving direction of the power means.

11. A reversing mechanism of the type described, including a driven shaft, a sliding shaft, a sleeve slidable on the driven shaft and connected to the sliding shaft, pinion collars having a rotary non-sliding mounting on the driven shaft on each side of the sleeve, a ring rotatable and slidably mounted on the driven shaft between each end of the sleeve and the adjacent pinion collar, the sleeve ends, the rings, and the pinion collars having cooperating teeth for driving interlock under selective movement of the sleeve, the teeth on the rings facing the pinion collars having inclined faces to frictionally engage the edges of the pinion collars prior to the engagement of their interlocking teeth, whereby to compel a gradually increasing frictional sliding contact prior to direct tooth engagement.

12. A reversing assembly for use in connection with power driven machines of the type including a primary shaft continuously driven by power means and power reversing elements on the shaft, said reversing means including relatively opposed power driving elements, an intermediate slide element for selectively compelling driving action of either of said power elements, and a cushioning element interposed between said slide element and each of said power elements for driving connection between the slide element and a selected power element, each cushioning element being formed with cushioning areas to be initially engaged by the slide element to inaugurate gradual non-shock movement of the cushioning element, said cushioning element being further formed with additional cushioning areas to act to gradually inaugurate a proper driving direction of the selected power element.

13. A reversing assembly for use in connection with power driven machines of the type including a primary shaft continuously driven by power means and power reversing elements on the shaft, said reversing means including relatively opposed power driving elements, an intermediate slide element for selectively compelling driving action of either of said power elements, and a cushioning element interposed between said slide element and each of said power elements for driving connection between the slide element and a selected power element, each cushioning element being formed on opposite sides with cushioning areas, one to be engaged by the slide element for gradual non-shock cooperation and the other to initially engage the selected power driving element for compelling proper driving engagement thereof, the cushioning areas being inclined.

14. A construction as defined in claim 12, wherein the cushioning element is normally interlocked with the adjacent power element and moves in the same direction as such power element, the cushioning cooperation of the slide element reversing the cushioning element with respect to the power element and disconnecting the interlocked power element and cushioning element and incorporating a cushioning contact acting under friction to gradually reverse the power element.

15. A reversing mechanism of the type described, including a continuously driven power shaft, gear-carried power elements mounted in spaced relation on the shaft, said power elements being held against relative longitudinal movement but otherwise free on the shaft, a controlled slide element mounted on the shaft for sliding non-rotating connection therewith, and a cushioning element rotatably and slidably mounted on the shaft between the ends of the slide element and each power element, the cushioning elements having inclined surfaces to wedgingly cooperate respectively with the slide element in movement of the latter to select a power element and with that power element, whereby initial shock and noise otherwise incident to driving cooperation of these parts is avoided.

16. A construction as defined in claim 15, wherein the slide element and proximate end of the cushioning element have cooperating tooth formation, the wedging cooperation of the cushioning element and power element gradually forcing the cushioning element and slide element into tooth cooperation.

17. A construction as defined in claim 15, wherein the power element being selected by slide element control for driving function and the cooperating cushioning element are in toothed engagement and moving before selection in a direction the reverse of the power-drive direction, and wherein inclined cushioning drive of the cushioning element by the slide in selective movement acts to reverse the cushioning element to disconnect its toothed connection with the power element and compel a wedging cushioning action between such parts to gradually reverse the selected power element.

18. A construction as defined in claim 15, wherein the power element being selected by slide element control for driving function and the cooperating cushioning element are in toothed engagement and moving before selection in a direction the reverse of the power-drive direction, and wherein inclined cushioning drive of the cushioning element by the slide in selective movement acts to reverse the cushioning element to disconnect its toothed connection with the power element and compel a wedging cushioning action between such parts to gradually reverse the selected power element, the elements and cushioning parts being so proportioned that the wedging cushioning cooperation between the cushioning element and the power element gradually forces the cushioning element into toothed cooperation with the slide element.

19. A construction as defined in claim 15, wherein each cushioning element is normally in engagement with the adjacent power element, and wherein each cushioning element is held normally yieldingly spaced from the slide member.

20. A construction as defined in claim 15, wherein each cushioning element is moved toward and into positive driving engagement with the slide element under the wedging cooperation between such cushioning element and the cooperating power element, and wherein means are provided to limit such movement of the cushioning member to a degree to prevent disconnection of the wedging cooperation of such cushioning element and the power element.

JOHN E. POORMAN.